US009152502B2

(12) United States Patent
Kalach et al.

(10) Patent No.: US 9,152,502 B2
(45) Date of Patent: Oct. 6, 2015

(54) DATA ERROR DETECTION AND CORRECTION USING HASH VALUES

(71) Applicant: Microsoft Corporation, Redmond, WA (US)

(72) Inventors: Ran Kalach, Bellevue, WA (US); Kashif Hasan, Snoqualmie, WA (US); Paul Adrian Oltean, Redmond, WA (US); James R. Benton, Hanover, NH (US); Chun Ho Cheung, Redmond, WA (US); Ahmed Moustafa El-Shimi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 13/724,464

(22) Filed: Dec. 21, 2012

(65) Prior Publication Data

US 2014/0181575 A1    Jun. 26, 2014

(51) Int. Cl.
*G06F 11/14* (2006.01)
(52) U.S. Cl.
CPC ........ *G06F 11/1435* (2013.01); *G06F 11/1402* (2013.01); *G06F 11/1412* (2013.01); *G06F 2201/83* (2013.01)
(58) Field of Classification Search
CPC ............ G06F 11/1412; G06F 11/0727; G06F 11/073; G06F 11/1004; G06F 11/14; G06F 11/1402; G06F 11/1435; G06F 2201/83
USPC ........ 714/6.13, 6.1, 6.11, 6.12, 6.2, 6.24, 6.3, 714/6.31, 6.32, 42, 54
See application file for complete search history.

(56) References Cited

U.S. PATENT DOCUMENTS

| | | | |
|---|---|---|---|
| 7,281,006 B2 * | 10/2007 | Hsu et al. | 714/6.1 |
| 7,546,492 B2 | 6/2009 | McCuller | |
| 7,694,191 B1 * | 4/2010 | Bono et al. | 714/48 |
| 7,913,114 B2 | 3/2011 | Leppard | |
| 8,239,515 B2 | 8/2012 | Chapweske | |
| 2006/0101088 A1 | 5/2006 | Frohn | |
| 2009/0234892 A1 | 9/2009 | Anglin et al. | |
| 2010/0037118 A1 | 2/2010 | Saliba et al. | |
| 2012/0072786 A1 * | 3/2012 | Bahali et al. | 714/704 |
| 2012/0131025 A1 | 5/2012 | Cheung et al. | |
| 2012/0158672 A1 | 6/2012 | Oltean et al. | |
| 2012/0166401 A1 | 6/2012 | Li et al. | |

OTHER PUBLICATIONS

Oracle, "Oracle Solaris ZFS Storage Management", in White Paper of Oracle Technical, Nov. 2011, 13 pages.

(Continued)

*Primary Examiner* — Joseph D Manoskey
(74) *Attorney, Agent, or Firm* — Henry Gabryjelski; Kate Drakos; Micky Minhas

(57) ABSTRACT

The subject disclosure is directed towards a data storage service that uses hash values, such as substantially collision-free hash values, to maintain data integrity. These hash values are persisted in the form of mappings corresponding to data blocks in one or more data stores. If a data error is detected, these mappings allow the data storage service to search the one or more data stores for data blocks having matching hash values. If a data block is found that corresponds to a hash value for a corrupted or lost data block, the data storage service uses that data block to repair the corrupted or lost data block.

20 Claims, 6 Drawing Sheets

(56) References Cited

OTHER PUBLICATIONS

Freeman, Larry, "How Safe Is Deduplication?", Available at: http://www.netapp.com/us/communities/tech-ontap/dedupe-0608.aspx, Sep. 19, 2008, 2 pages.

Commvault.com, "Deduplication", Available at: http://documentation.commvault.com/hds/release_8_0_0/books_online_1/english_us/features/single_instance/single_instance.htm, Retrieved on: Oct. 9, 2012, 8 pages.

\* cited by examiner

DATA ERROR DETECTION AND CORRECTION USING HASH VALUES

BACKGROUND

Data stored in memory and/or storage media, such as hard disks, is susceptible to hardware and/or software errors caused by myriad of reasons. Such errors often lead to data corruption and/or loss, which negatively affect computing device operation and thus, user productivity and monetary loss. A file, for instance, may be rendered inaccessible or unreadable due to data corruption and/or data loss. A bad hard disk sector renders any data stored therein unreadable and thus, lost. File system corruption may result in a loss of entire files. Corrupted data, typically, includes incorrect data that can no longer be used in the file. These data errors represent only a fraction of the potential data errors that cause data loss and/or corruption.

Because data errors occur in conventional data storage systems, mitigating and/or preventing such data errors is a significant aspect of maintaining data integrity. Furthermore, protecting sensitive data is often considered an information customer requirement. One common solution implements a redundancy mechanism where redundant copies of data are organized to prevent data loss. Another common solution uses backup and restore mechanisms where a data backup allows a user to recover lost and/or corrupted data. Such solutions incur substantial costs, including from offline administration, and often allow data corruption to remain undetected.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards data error self-healing using substantially collision-free hash values. If a data block's hash value is recorded in a persisted index, when a data error is detected at a later point in time, the hash value is used to determine whether a duplicate/identical data block exists and if so, recover original data. In one aspect, the duplicate data block is found as new data is being stored in a storage system. In another aspect, the duplication data block is found in an existing data store. In yet another aspect, the duplicate data block is generated through manipulation of a corrupted data block.

In one aspect, the data storage service integrates data deduplication and data error detection and repair using strong hash-based identification. Data deduplication generally refers to detecting, uniquely identifying and eliminating redundant data blocks and thereby reducing the physical amount of bytes of data that need to be stored on disk and/or transmitted across a network. When one of these redundant data blocks is lost and/or corrupted, the data storage service searches one or more hash indexes for a duplicate data block having a matching hash value. If such a duplicate data block is found, the data storage service replaces the lost and/or corrupted redundant data block with the duplicate data block. In one aspect, the data storage service detects and repairs lost and/or corrupted data blocks without user intervention.

In one aspect, in addition to a primary hash index for the redundant data blocks described herein, the data storage service maintains a sub-index comprising hash values corresponding to corrupted and/or lost data blocks. When looking for the duplicate data block, the data storage service searches the sub-index and any main index of redundant data blocks. If there is a match in the sub-index, the data storage service retains the correct data block, updates the sub-index with a reference to the correct data block, and deletes the corrupted or lost data block.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
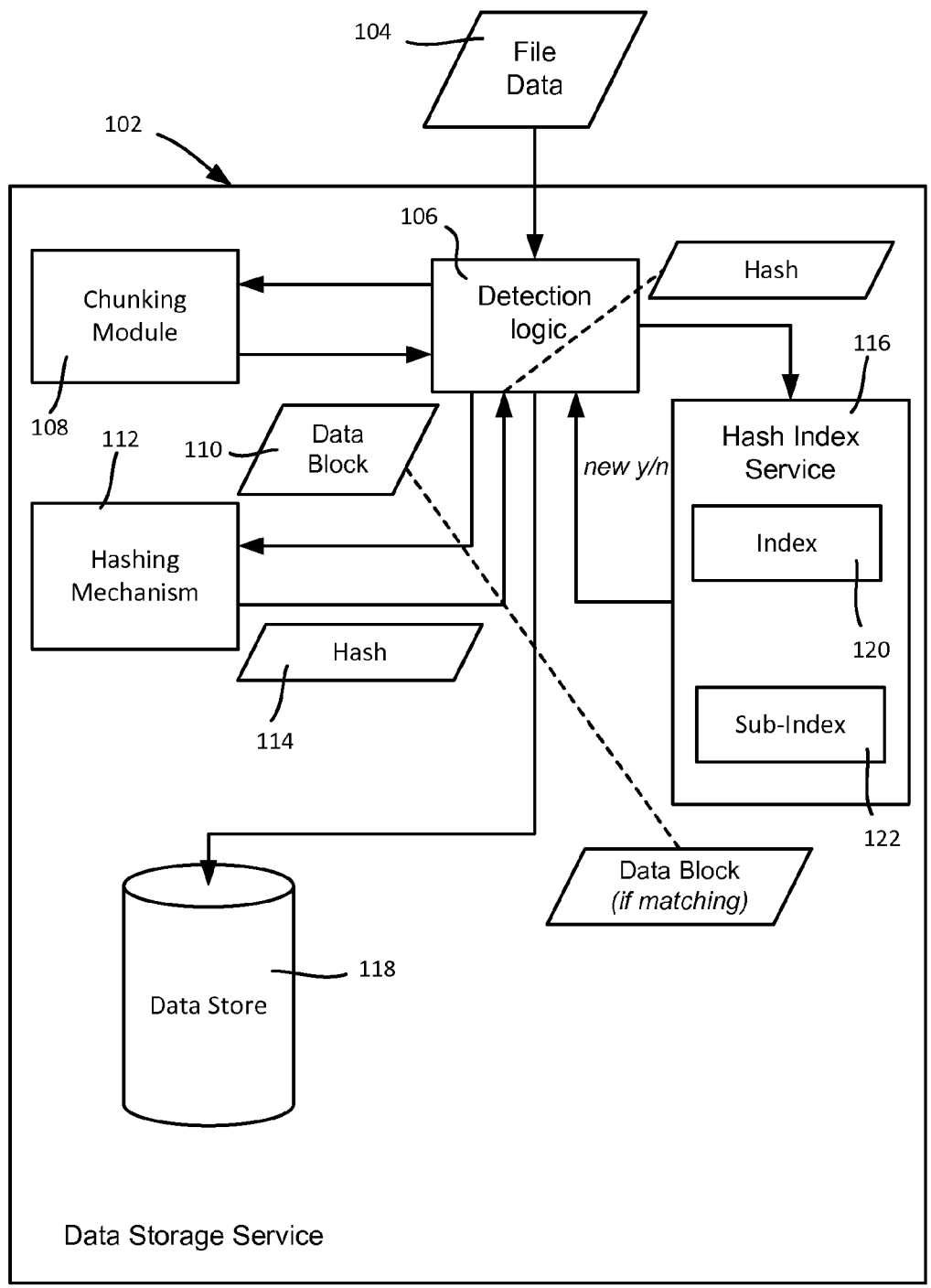
FIG. 1 is a block diagram illustrating an example system for repairing data blocks to correct at least one data error according to one example implementation.

Various aspects of the technology described herein are generally directed towards persisting a substantially collision-free hash value for repairing a data block in cases of data corruption or loss. It is appreciated that the substantially collision-free hash value may be referred to as a "strong" hash, without loss of generality, at various points throughout the present disclosure In one example implementation, a data storage service employs a combination of techniques for eliminating data corruption or loss within and between persistently stored files. One such technique operates to detect corrupted data blocks in one or multiple files and search one or more data stores for a duplicate data block comprising original/correct content for the corrupted data block. By replacing the corrupted data block (or references thereto) with the duplicate, non-corrupted block (or references thereto), the data storage service repairs the error.

Furthermore, the data storage service may apply such a repair mechanism in a data deduplication system that already computes hash values for data blocks, which the data storage service uses to find duplicates of lost and/or corrupted data blocks. To illustrate one example, using detection logic, the data storage service computes a strong hash value for a certain data block. As explained earlier, a strong hash corresponds to a hash value considered such that collisions are statistically negligible; in other words, two data blocks with the same hash value can be considered identical (duplicate) for all practical purposes. An example for storing such hash values is a persistent index that maps the hash value to a data block identifier ("blockId") or data block location. In addition to a main index for identical data blocks, the data storage service maintains an additional hash index, known as the sub-index, for corrupted and/or lost data blocks using the same data structure as the main index or, alternatively, a different structure.

In one example implementation, when a new data block is ingested, the data storage service searches for identical blocks and determines whether any identical data block, based upon a matching hash value, is corrupted or lost. If, after recomputing one example identical data block's strong hash, the new data block's strong hash no longer matches the example identical data block's original strong hash, the example identical data block's content is most likely corrupt. Accordingly, the data storage service enhances data deduplication logic by preventing another reference to a corrupted and/or lost data block from being added to the index, and further by using the new data block to repair the corrupted and/or lost data block.

In one example implementation, the data storage service detects a corrupted data block and searches data blocks in other data stores for a duplicate data block having a matching hash value. If one such data block is found, the data storage service replaces the corrupted data block with correct data. Regarding a file in which the corrupted data block resides, the data storage service may use a file's schema or structure to correct the corrupted data. Hence, the data storage service is self-healing and does not request user involvement and/or utilize a data backup/storage technology. The user, for instance, does not restore the corrupted data block from a backup if the data storage service is actively searching for a duplicate data block. The data storage service may search local and/or network accessible data stores for a replacement data block having the matching hash value.

One alternative implementation manipulates a corrupted data block, computes the substantially collision-free or strong hash value of the manipulated data block for comparing to the original strong hash value, and accepts the manipulated data block as correct if these hash values match. Another alternative implementation iteratively modifies a contextually similar data block until a matching hash value is found (assuming computational resources available to the data storage service are sufficient to enumerate the potential variations of the corruption).

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and maintaining data integrity in general.

FIG. 1 is a block diagram illustrating an example system for repairing data blocks to correct at least one data error according to one example implementation. FIG. 1 further depicts example components of a self-healing storage system, such as implemented in a data storage service 102. The following description refers to integrating corrupted/lost data block repair with data deduplication as implemented by the data storage service 102. The service 102 receives data 104 (e.g., a file or a portion of a file), and detection logic 106 processes the data 104 for error detection and/or correction. It is appreciated that the data storage service 102 may include other components that operate with the detection location, such as deduplication logic. To this end, the detection logic 106 provides the data 104 to a chunking module 108, which partitions the data 104 into a plurality of data blocks for deduplication as described herein.

The chunking module 108 may partition the data 104 using various techniques, for example, according to the structure of a file or by using an algorithm based on fast hashing techniques (e.g., CRC and Rabin families of functions), which may be performed inline when the data 104 is ingested or post-processing. It is appreciated that a data block size (e.g., number of bytes) may be fixed or variable. As an example, the chunking module 108 may split a file into a plurality of sixty-four (64) KB fixed data blocks as such blocks are being written to a volume and added to a file-system. In another example, the chunking module 108 may split a file into a plurality of data blocks of variable size as such blocks are being written to a volume and added to the file-system. The following description is with respect to one data block 110, although it is understood that the data 104 is typically partitioned into multiple data blocks.

The detection logic 106 passes the data block 110 to a hashing mechanism 112, which computes a hash 114 of the data block 110. The hash 114 may comprise a substantially collision-free hash value, which may be referred to as a strong hash value. A strong hash function, for example, a cryptographically secure SHA-256 or SHA-512 hash function or the like, ensures an extremely low probability of collisions between hash values and may be used to compute the hash 114 distinguishing the data block 110 from other blocks of the plurality of data blocks. Note that with such a strong hash, the probability of a hash collision may be substantially collision-free, e.g., a hash collision may be around thirty orders of magnitude less likely than a hardware error given the most reliable hardware currently available.

The hash 114 is provided to a hash index service 116, which compares the hash 114 to one or more indexes. An example index may be a persisted index that maps a strong hash value to a data block identifier (blockId) or data block location (e.g., an offset from a starting byte) within a data store 118. If the hash 114 is found in such an index, there is a strong likelihood that a duplicated copy of the data block 110 has already been deposited in the data store 118 or at least one error occurred causing the duplicate copy to become lost and/or corrupted. If the hash 114 is not found in any index by the hash index service 116, the data block 110 is stored into the data store 118, and the hash 114 is recorded in a primary index (not shown) by the hash index service 116.

The detection logic 106 employs various mechanisms to detect data block errors in the data store 118. One example mechanism that involves dynamic monitoring identifies data corruption/loss, for example, when a user attempts to access a file comprising the corrupted data. To this end, each accessed file block or the like may be hashed to determine if that block became corrupted, that is, when the current hash value differs from the previously stored hash value for that block.

Instead of dynamic monitoring, the data storage service 102 may be configured to detect data corruption or loss by scanning data blocks in the data store 118 for data integrity/loss issues. For example, the data storage service 102 may perform a corruption scan (e.g., a scrub job) that checks stored data blocks in the data store 118 and compares each data block to a corresponding strong hash or another checksum. One example mechanism uses an alternative authentication value, such as a checksum value, previously associated with the data block.

If the data block 110 becomes corrupted and such corruption is detected during the dynamic monitoring, the corruption scan, or some other corruption detection technique, the detection logic 106 removes any reference to the corrupted data block 110 from an index 120 (e.g., the primary index) within the hash index service 116. Although not necessary, as an option, the detection logic 106 may move the corrupted data block 110 to a corrupted data store. A corresponding hash value is stored in a persisted (hash) index, which is referred to as a sub-index 122 within the hash index service 116. A (memory) reference to the corrupted data block 110, whether stored in the data store 118 or the corrupted data store, is added to the sub-index 122. If, alternatively, the data block in the data store 118 became inaccessible (e.g., lost due to bad disk sector), the detection logic 106 stores a reference to the lost data block and records the corresponding hash in the sub-index 122.

The sub-index 122 includes various data corresponding to corrupted/lost data blocks. For example, the sub-index 122 includes a strong hash that was computed for each data block before any data corruption and/or loss. The sub-index 122 further includes a reference to the corrupted/lost data block location to enable the data storage service 102 to read or rewrite that data block as part of a repair operation. The data storage service 102 persists the sub-index 122 such that the sub-index 122 maps to the corrupted/lost data blocks as these data blocks are detected. For example, the sub-index 122 may include a log of data block identifiers (blockIds), a database or any other suitable data structure.

The data storage service 102 may utilize various self-healing techniques to repair a known corrupted or lost data block indicated by the sub-index 122. The data storage service 102 may repair such a data block with new data (e.g., future data) that is determined to be a correct version of the corrupted/lost data block. After computing a substantially collision-free hash value of a new data block, if the hash index service 116 indicates a matching hash value in the sub-index 122, the new data block is a duplicate of the corrupted/lost data block except devoid of data errors. The detection logic 106 may use the new data block to repair the corrupted/lost data block by replacing references to or overwriting that data block with the new data block.

In some example implementations, the detection logic 106 schedules an offline repair operation during which a new file stream map is constructed for replacing the corrupted/lost data block. Once the corrupted/lost data block is repaired, the detection logic 106 removes the corresponding hash value and/or reference from the sub-index 122 and records the corresponding hash value and/or reference in the index 120.

The data storage service 102 may repair a known corrupted/lost data block with existing data that is determined to be identical to that data chunk. According to some example implementations, the data storage service 102 uses any relevant technique to search for duplicate data blocks, such as initiating a query to a higher-level namespace or examining additional data stores. As an example, the data storage service 102 may search in other primary hash indexes for a data block with a strong hash value matching the corrupted data block's hash value. The data storage service 102 may search any hash index available on peer storage systems for the matching hash value. In yet another example, the data storage service 102 crawls data stored in other storage systems and computes strong hashes until a match is found. In order to locate and identify data blocks residing on other storage systems, as an example, the data storage service 102 may use Microsoft® Windows® BranchCache™, which enables content from file services and Web servers on a wide area network (WAN) to be cached on computers at a local branch office. Such storage systems may include any type of network-accessible storage system, such as a peer storage system.

It is appreciated that the data storage service 102 may utilize other data (e.g., from an external source) to identify locations corresponding to duplicate data. If a match is found on a same/peer/other storage system, the data storage service 102 uses the duplicate data block to repair the corrupted/lost one. For instance, the data storage service 102 stores a copy of the duplicate data block in the data store 118, assigns a block identifier and a corresponding hash value to that copy, and stores the block identifier and the corresponding hash value in the index 120. Once the corrupted data block is repaired, the detection logic 106 removes a reference to that data block from the corrupted data block index referred to as the sub-index 122.

In one example implementation, the data storage service 102 repairs a known corrupted/lost data block by manipulating that data block (or a similar data block) and comparing the manipulated data block with the original strong hash. The data storage service 102 may iterate through more than one manipulation until an original data block is produced or until predetermined algorithmic or computational limits are reached before a data block matching the original data block is found. By way of example, there may be an insubstantial difference between the corrupted data block and the original data block. For instance, only a certain number of lost bits of data may differ (e.g., one bit flipped), in which event a bit-by-bit flipping manipulation, with each iteration followed by a hash computation and comparison to see if the bit flipping resulted in correcting the corruption.

The data storage service 102 may manipulate the data block based on external context to other data which may be similar to the original data block 110. A file structure may provide hints regarding which data blocks are likely to become lost and/or corrupted. For instance, an Extensible Markup Language (XML) file may be corrected by use of an XML schema and information indicating when data corruption is likely to occur, e.g., non-textual data in a text-only location, and/or which data blocks (or specific offsets therein) are likely to be corrupted/lost. Commencing data block manipulation at these data blocks may yield a correct data block more efficiently than starting such manipulation at arbitrary positions. The XML schema may correspond to another XML file (e.g., a similar XML file) that is known to include correct and/or uncorrupted data for the above XML file.

According to one example implementation, the data storage service 102 commences data block manipulation upon the corrupted/lost data by enumerating each potential or in-scope variation. One bit, for instance, may have flipped or changed at some moment during storage. The data storage service 102 scans a corrupted data block (byte by byte) and flips one bit at a time. After each bit flip, the data storage service may compute a strong hash value for the manipulated corrupted data block with a single bit flip. The data storage service 102 searches the sub-index 122 and/or other corrupted data block hash index for a matching hash value. If a match is found, the data storage service 102 uses the manipulated corrupted data block to repair the corrupted data block, for example, by applying a same sequence of manipulations on the corrupted data block or using the manipulated corrupted data block, which is considered correct, to find a new or existing duplicate data block to replace the corrupted data block. Once the repair process is completed, the data storage service removes each reference to the corrupted data block from the sub-index 122.

Figure 2:
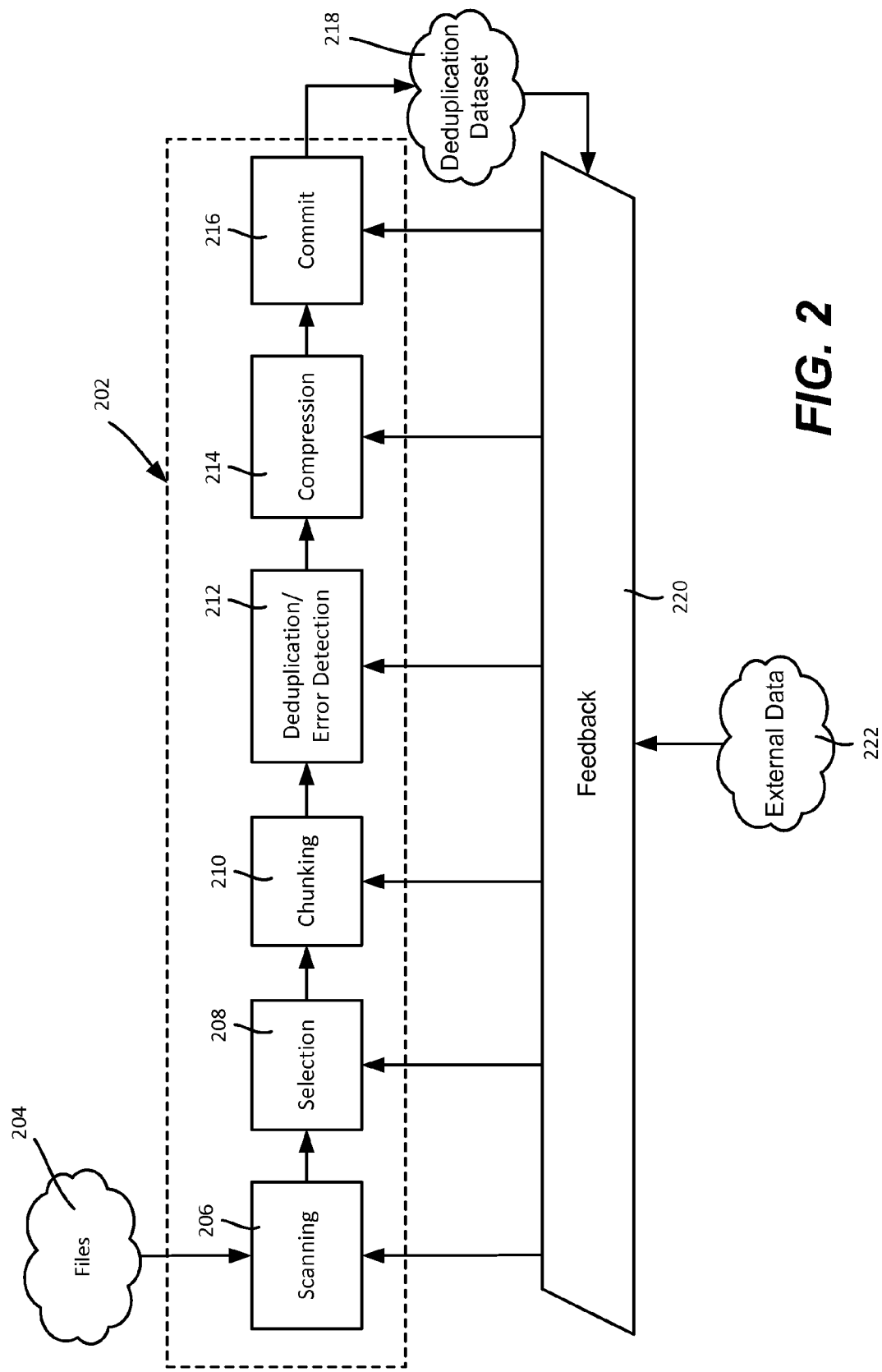
FIG. 2 is a block diagram representing example components/phases of a deduplication process according to one example implementation.

FIG. 2 is a block diagram representing example components/phases of a deduplication process 202 according to one example implementation. FIG. 2 shows example concepts of a software component (or set of components), referred to as deduplication logic, to handle the deduplication of files 204. Using strong hash values, one phase of the deduplication process 202, as described herein, determines whether a data block to be deduplicated may be used in repairing a previously deduplicated data block having at least one data error.

Note that while files are used as an example herein, a deduplication target may include any collection of "data streams" in an unstructured, semi-structured or structured data storage environment, e.g., files, digital documents, streams, blobs, tables, databases, and so forth; the pipeline architecture is designed to be generic and reusable across a large variety of data stores. In general, the deduplication process 202 splits each file (or other data blob) into a consecutive sequence of small data streams called data blocks, and identifies each data block using a substantially collision-free hash value (e.g., a strong hash value) and then, performs a lookup (via a hash index) for the existence of a duplicate data block that was previously inserted in the system. When a duplicate data block is identified, the specific region in the file corresponding to the original data block is updated with a reference to the existing data block and the data block from the file discarded.

As described herein, before discarding, if the existing data block is determined to be corrupt or rendered inaccessible, the deduplication process 202 repairs the existing data block with the corresponding data block from the file. If the data block from the file matches a strong hash value of a known lost or corrupted data block, the deduplication process 202 uses the data block from the file to repair the known lost or corrupted data block. Otherwise, if a duplicate is not detected, the data block is saved to a data store in one implementation (or other suitable location), indexed, and the file updated with a reference to the new data block, which may then be detected for referencing by other files.

The deduplication process 202 includes file-system related phases, implemented as one or more modules per phase. This includes a scanning phase 206 (including a scanner/groveler module) that scans the set of files 204 of a storage volume or the like to determine which ones are candidates for deduplication, generally those not already deduplicated. The scanning phase's output basically comprises a list of files that is dynamically consumed by the next phase of the deduplication pipeline, comprising a selection phase 208. A chunking phase 210 (which may include or follow file decompression as needed in a given implementation) decomposes the file content into data blocks; the data blocks may be compressed during a compression phase 214.

The data blocks produced during the chunking phase 210, which may be processed in batches, are consumed by the next stage of the deduplication process 202, namely a deduplication/error detection phase 212 that identifies each data block through hashing and then uses the hash value for deduplication and error detection. The deduplication/error detection phase 212 provides a list of block identifiers whose corresponding data blocks are already inserted in the data store and specifies which of these data blocks, if any, have been lost and/or corrupted. If a previously deduplicated data block is known to be corrupted and/or lost, the deduplication process 202 moves each reference to such a data block from a primary index (e.g., the index 120 of FIG. 1) to a persistent sub-index (e.g., the sub-index 122 of FIG. 1).

If a hash index service (e.g., the hash index service 116 of FIG. 1) indicates that the data block is already present in the data store, a reference/count is added to the primary index. If, alternatively, the hash index service indicates that the data block is present in a corrupted data block index, the deduplication process 202 stores the data block in the data store and indexes a reference to that data block's location and the strong hash value in the primary index. In some alternative implementations, the deduplication process 202 also removes a corresponding hash value and reference from the corrupted data block index. If the data block is not yet present in any data store, the data block is added as a new data block to the data store and indexed in the primary index.

The deduplication process 202 maintains a persistent index (e.g., a database) of the actual data blocks. The deduplication/error detection phase 212 supports inserting a new data block into the data store (if there is no such data block yet), adding reference data to an existing data block in the data block store (upon detecting a previously persisted data block), and committing a set of data block inserts and/or data block reference additions. The data block store also may implement various background/maintenance jobs, including garbage collection, data/metadata checking, and so forth. The deduplication process 202 may work with multiple data stores and store data blocks based on their attributes. For example, popular data blocks may be stored in a near-line low-latency low-scale store, while the rest of the data blocks may be stored in higher-latency, high-scale store.

The deduplication/error detection phase 212 maintains a corrupted data block hash index, referred to as a sub-index, for corrupted and/or lost data blocks, according to one example implementation. When looking for duplicate data block in any of the above described data stores, the deduplication/error detection phase 212 may search the sub-index and the primary index. If there is a match in the sub-index, the deduplication/error detection phase 212 instantiates a correct data block in the deduplication dataset 218, stores a reference and a hash value for the correct data block in the primary index and updates the sub-index to reflect the correction.

To add a new data block to the data store comprising the deduplication dataset 218, for a given file, such an operation is performed in two phases by a commit module (phase) 216. First, the new data blocks are added (e.g., in a batch) to the data store. Second, after the file data blocks have been processed, the list of data blocks is "committed" to the data block store. The list of chunk locators is serialized into a "stream map" structure, which is then used to create a data block stream.

Moreover, the phases of the deduplication process 202 are also externally tunable and provide hooks for feedback 220 (FIG. 2), that is, the pipeline is adoptable and can adjust its policies, selection algorithms, parameters and the like while it runs or for future runs based upon already-gained knowledge. The feedback may be internal (based on already-processed data) and/or external 222 (provided by an external entity, for example based on data optimized on other volumes or other machines).

Figure 3:
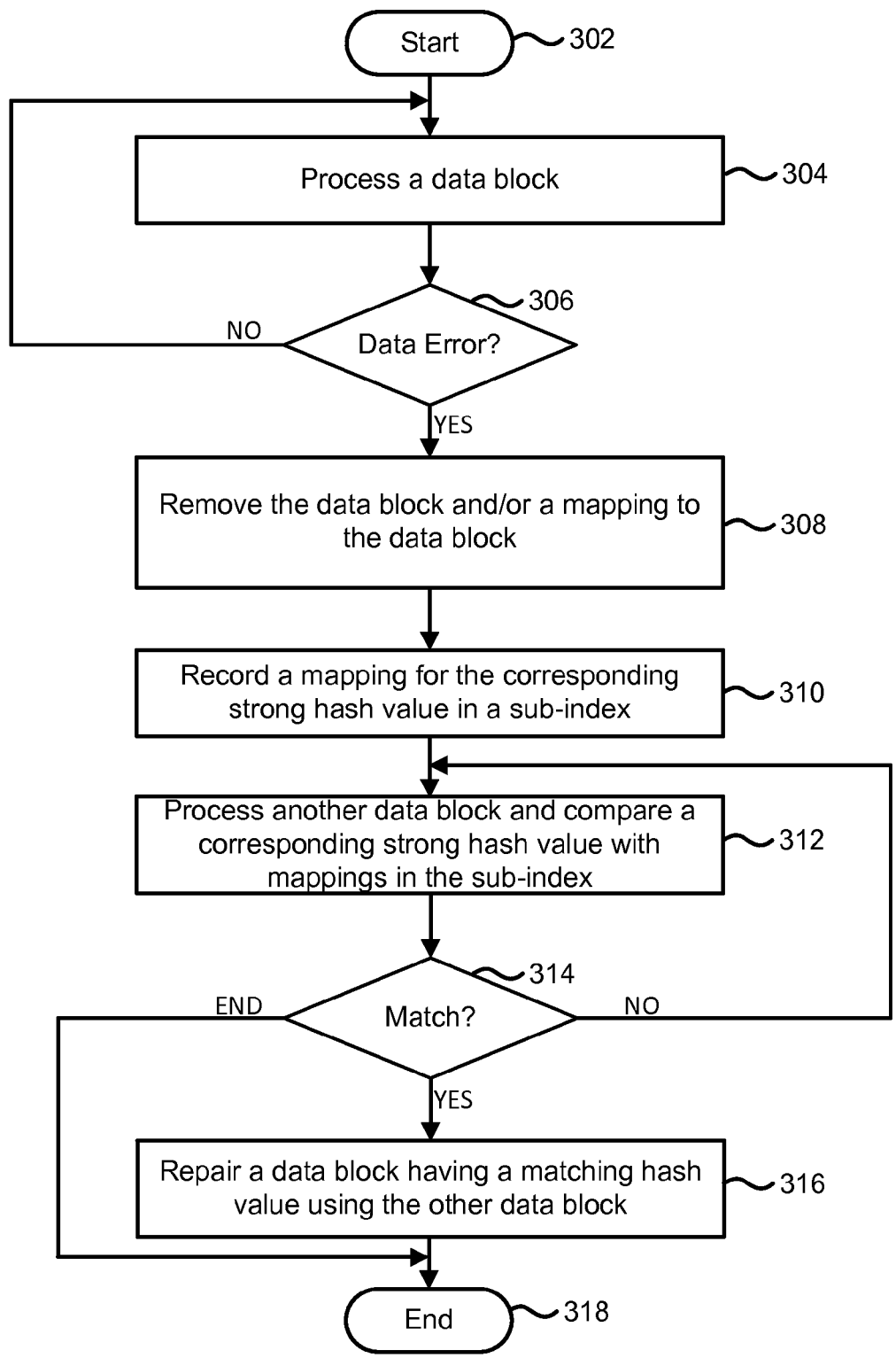
FIG. 3 is a flow diagram illustrating example steps for persisting a sub-index corresponding to data blocks having at least one error according to one example implementation.

FIG. 3 is a flow diagram illustrating example steps for persisting a sub-index corresponding to data blocks having at least one error according to one example implementation. One or more hardware/software components of a data storage service (e.g., the data storage service 102 of FIG. 1) may be configured to perform the example steps described for FIG. 3, which commence at step 302 and proceed to step 304 where a data block of a plurality of data blocks is processed.

Step 306 determines whether the data block has any data errors. As described herein, one example data storage service component may apply dynamic monitoring/detection techniques to identify data corruption/loss, for example, when a user attempts to access a file comprising the corrupted or inaccessible data, or in a deduplication mechanism when a data block is received that matches an already-existing block's indexed hash value but that data block is determined to be lost/corrupted. If, for instance, after recomputing the already-existing data block's hash value, the indexed hash value does not match the recomputed hash value, there is a strong likelihood of data corruption. As another example, if the already-existing data block is located in a bad disk sector, there is a strong likelihood of data loss/inaccessibility.

As an alternative, the data storage service 102 may engage in actively scanning each data store for data integrity/loss issues. One alternative implementation executes a corruption scan (e.g., a scrub job), which involves scanning data blocks and comparing strong hash values. If there are no data errors in the data block, step 306 returns to step 304 and processes another data block of the plurality of data blocks. If step 306 detects at least one data error, step 306 proceeds to step 308.

Step 308 refers to removing the data block from the data store and/or a corresponding strong hash value and reference from an index. According to one example implementation, the example data storage service component stores the reference to a corrupted data block in a corrupted data block hash index, which is referred to herein as a sub-index. Step 310 is directed towards recording a mapping for the corresponding strong hash value in the sub-index.

Step 312 represents processing of another data block and comparing the corresponding strong hash value with mapping in the sub-index. The other data block may be stored in another data store, such as a remote data store on a network access storage device. It is appreciated that a considerable amount of time may elapse between step 310 and step 312, in some example embodiments, before data loss/corruption is detected. Step 314 searches the mappings in the sub-index for a hash value matching the corresponding strong hash value. If a matching hash value is found, step 314 proceeds to step 316 where a data block having the matching hash value is repaired using the other data block. A number of data block repair techniques are discussed herein and are applicable to performing step 316. For instance, the data block is overwritten by data from the other data block. Step 318 terminates the example steps described for FIG. 3.

Figure 4:
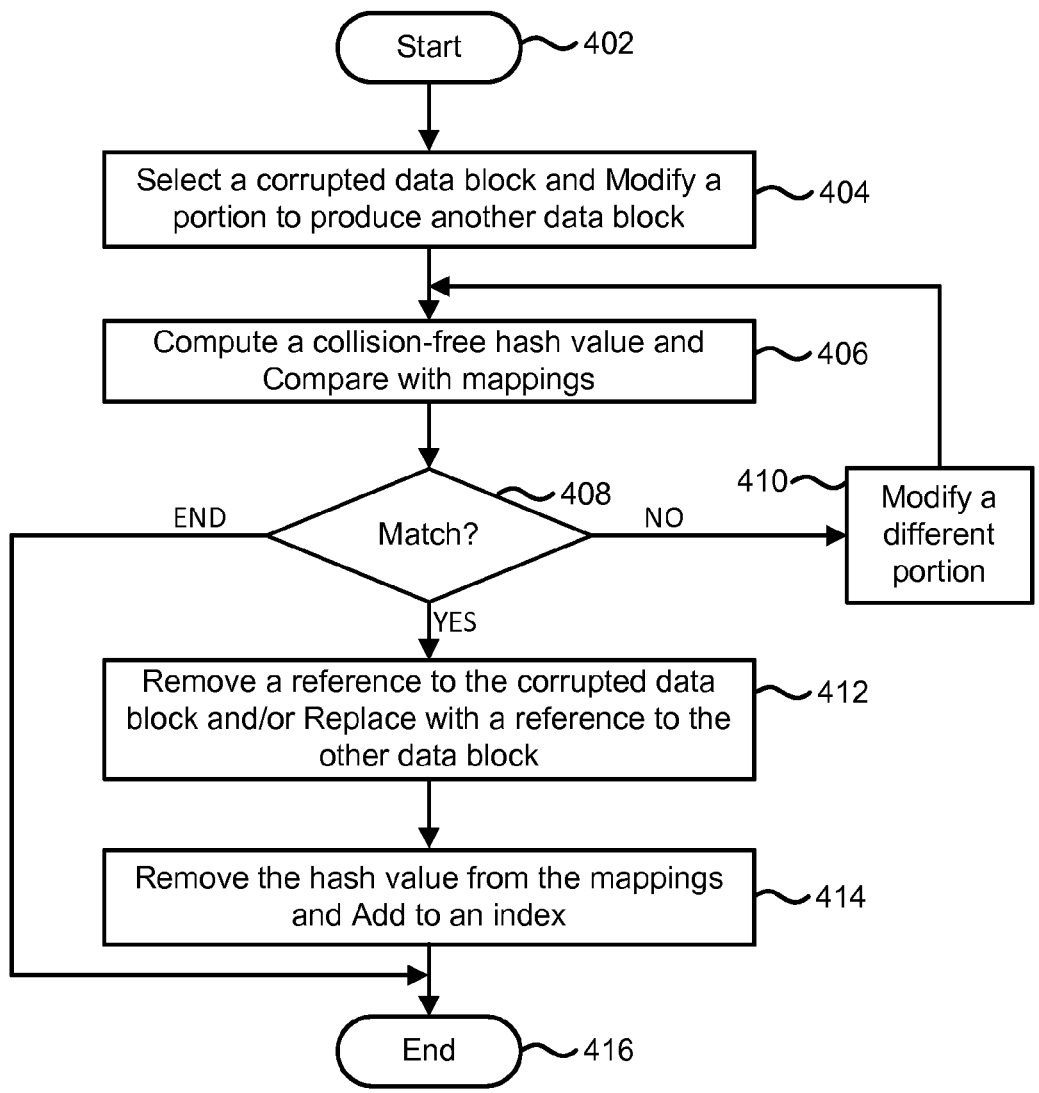
FIG. 4 is a flow diagram illustrating example steps for manipulating a corrupted data block to produce another data block for repairing the corrupted data block according to one example implementation.

FIG. 4 is a flow diagram illustrating example steps for manipulating a corrupted data block to produce another data block for repairing the corrupted data block according to one example implementation. One or more hardware/software components may be configured to perform the example steps described for FIG. 4, which commence at step 402 and proceed to step 404 where a hardware/software component selects a corrupted data block and modifies a portion thereof to produce another data block.

Any number of data manipulation techniques may be employed during step 404, including iteratively changing one bit value until a data block is produced with a matching hash value. Step 406 refers to computing a strong hash value for comparing with mappings. As described herein, these mappings refer to a sub-index comprising strong hash values for lost/corrupted data blocks. Step 408 determines whether the strong hash value matches any of the hash values in the mappings. Step 408 proceeds to step 410 if none of the mappings include a matching hash value. Step 410 refers to modifying another portion of the data block to produce yet another data block that differs from the other data block. File related context may provide information as to which bits to modify in order to produce a correct version of the corrupted data block. Certain document formats, for example, include various structural limitations that, when violated, indicate data corruption. An Extensible Markup Language (XML) file may be corrected by identifying which attributes do not conform to an XML schema because such blocks are likely corrupted. Step 410 may reset the other data block back to the corrupted data block and modify a different portion. Step 410 returns to step 406 and computes another collision-free hash value.

If one of the mappings does include the matching hash value, step 408 to step 412. Step 412 refers to removing the corrupted data block and replacing that data block with the other data block. Step 414 removes the hash value from the mappings for addition to an index. Step 416 terminates the example steps described for FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
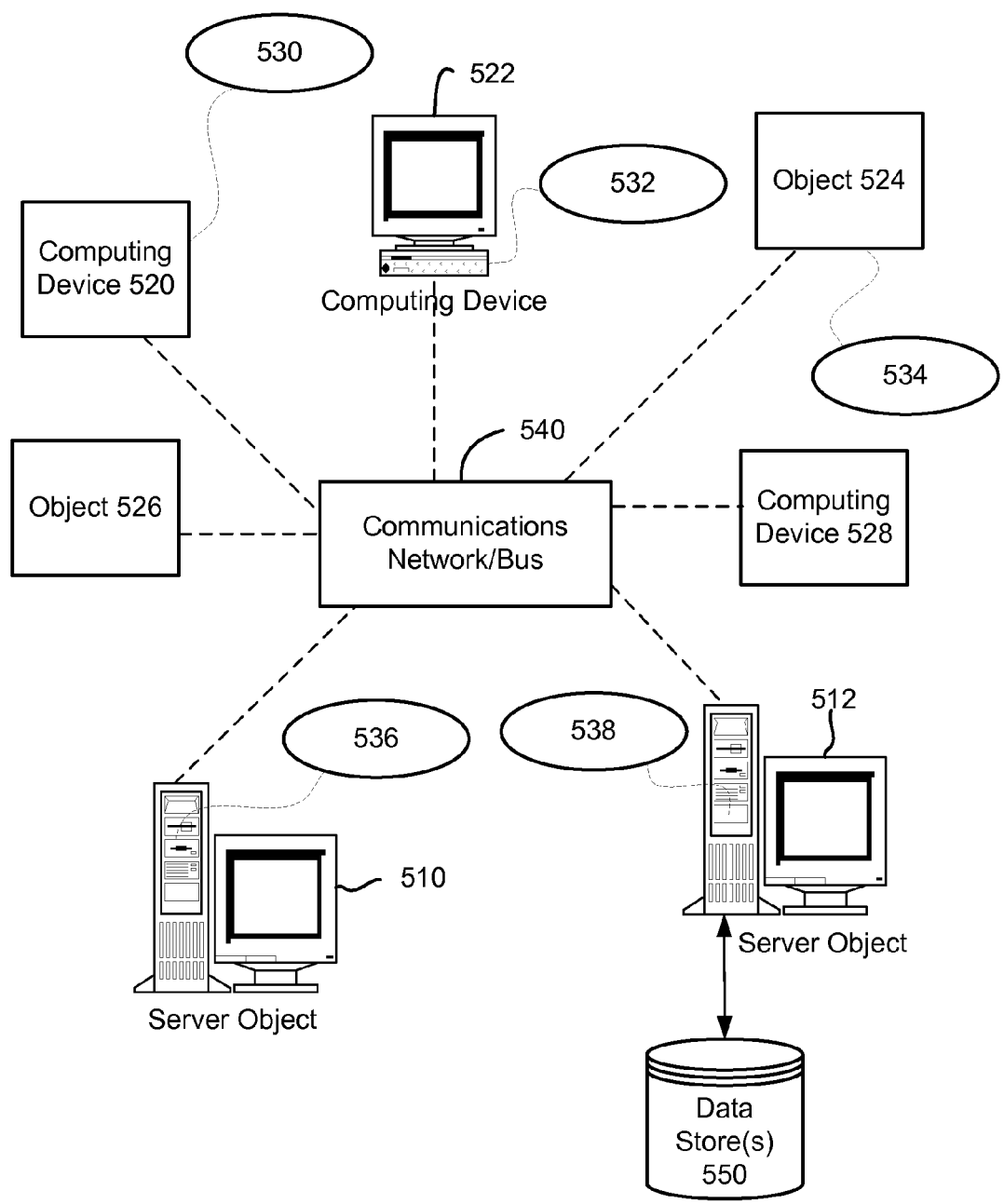
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
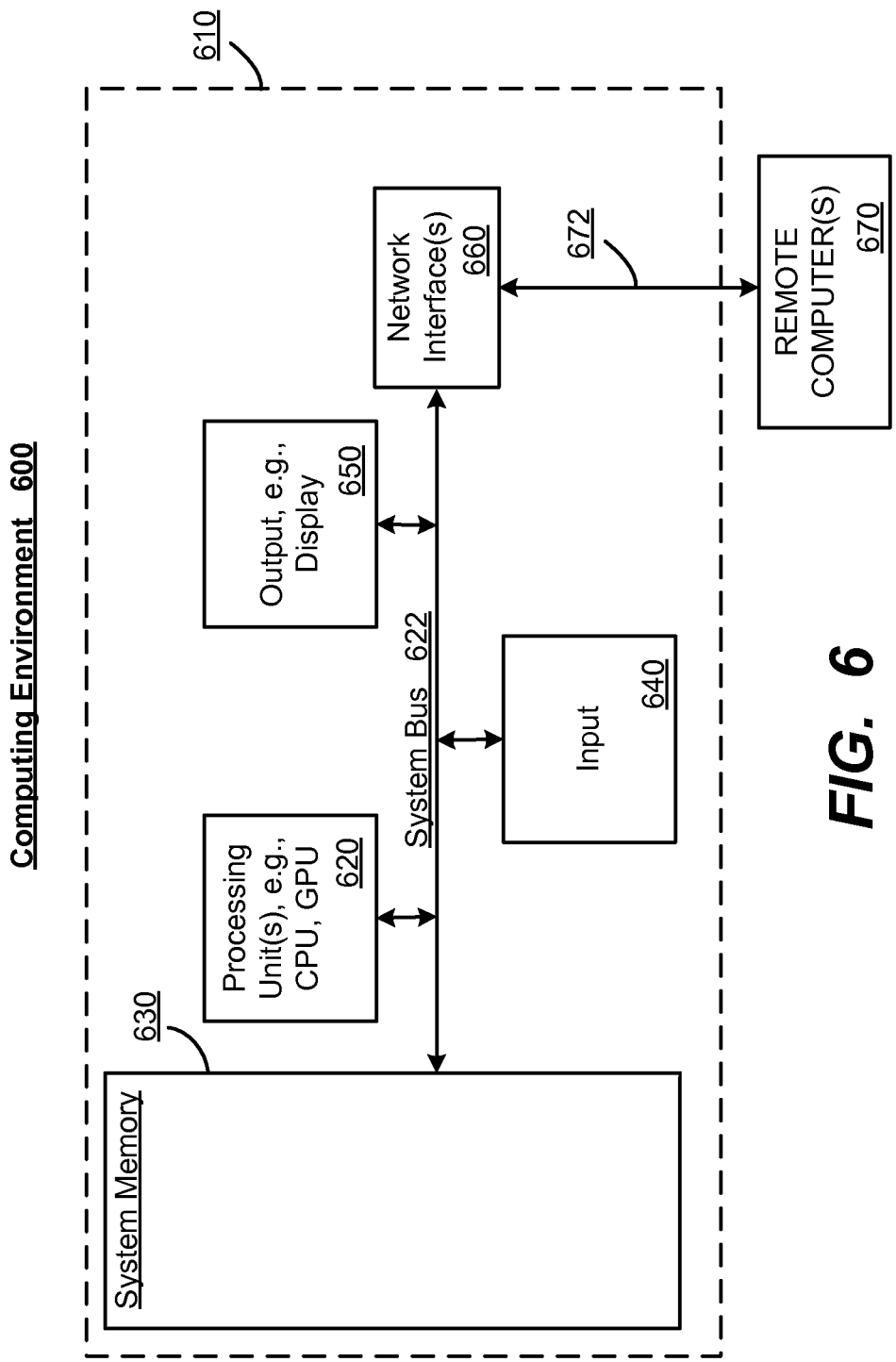
FIG. 6 is a block diagram representing an example non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for maintaining data integrity in a data storage service, the method comprising:
   accessing mappings between hash values and data blocks;
   comparing a first hash value of a corrupted data block with the mappings;
   upon determining that a matching hash value for the first hash value does not exist, modifying the corrupted data block;
   performing a hash on the modified corrupted data block to produce a second hash value;
   comparing the second hash value with the mappings; and
   if the mappings comprise a matching hash value for the second hash value, repairing at least a portion of the corrupted data block using applicable data from a data block that corresponds to the matching hash value.

2. The method of claim 1 wherein the second hash value is a collision-free hash value.

3. The method of claim 2 wherein the first hash value is a collision-free hash value.

4. The method of claim 3, wherein repairing the at least one portion of the corrupted data block further comprises writing the applicable data from the data block that corresponds to the matching collision free hash value over the corrupted data in the corrupted data block.

5. The method of claim 1, wherein repairing the at least one portion of the corrupted data block further comprises updating the mappings with a reference to the repaired corrupted data block.

6. The method of claim 1 wherein the data block that corresponds to the matching collision free hash value includes an uncorrupted version of the corrupted data block.

7. The method of claim 6, wherein modifying the at least one portion of the corrupted data block further comprises flipping at least one bit of the corrupted data block.

8. The method of claim 6 further comprising upon repairing the at least one portion of the corrupted data block, updating the mappings with a reference to the repaired corrupted data block replacing the corrupted data block.

9. The method of claim 1 further comprising: detecting a first data block having at least one error;
   persisting a first collision-free hash value for the first data block; and
   identifying the first data block as the corrupted data block.

10. The method of claim 9 further comprising searching at least one data store for a second data block having a second collision-free hash value matching the first collision-free hash value.

11. The method of claim 1 further comprising scanning data blocks in a data store in which each corresponding hash value is computed and compared with a primary index associated with the data store to identify the corrupted data block in the data store.

12. In a computing environment, a system comprising:
a processor;
a data store comprising data blocks associated with an index comprising collision-free hash values that correspond to the data blocks; and detection logic, that when executed by the processor, causes the processor to:
detect a corrupted data block within the data store;
compare a first hash value of the corrupted data block with the collision free hash values;
upon determining that a matching collision free hash value for the first hash value does not exist, modify the corrupted data block;
perform a hash on the modified corrupted data block to produce a second hash value;
compare the second hash value with the collision free hash values; and
if a matching collision free hash value for the second hash value exists, repair at least a portion of the corrupted data block using applicable data from a data block that corresponds to the matching collision free hash value.

13. The system of claim 12, further comprising a persistent sub-index, and wherein the detection logic further causes the processor to store a reference to each corrupted data block in the persistent sub-index.

14. The system of claim 13, wherein the detection logic further causes the processor to:
replace the corrupted data block with the data block that corresponds to the matching collision free hash value by adding a corresponding hash value and block identifier to the index and removing the corresponding hash value and block identifier from the sub-index.

15. The system of claim 12, wherein the detection logic further causes the processor to determine which portion of the corrupted data block to modify based on a context of a corresponding file.

16. One or more computer-readable storage media having computer-executable instructions, which when executed perform steps, comprising:
accessing a data store comprising a plurality of data blocks associated with an index comprising hash values corresponding to the plurality of data blocks;
detecting a corrupted data block within the data store;
accessing a peer storage system comprising a second data store;
querying an associated namespace for the second data store to identify a file comprising a duplicate data block for the corrupted data block;
replacing the corrupted data block with the duplicate data block by storing the duplicate data block in the data store; and
updating the index with a corresponding hash value and reference to the duplicate data block.

17. The one or more computer-readable storage media of claim 16 having further computer-executable instructions comprising:
performing a corruption scan of the data store to identify the corrupted data block;
persisting a hash value for the corrupted data block in a sub-index; and
using data from the duplicate data block to repair the corrupted data block.

18. The one or more computer-readable storage media of claim 16 wherein the hash values are collision-free hash values.

19. The one or more computer-readable storage media of claim 16 having further computer-executable instructions comprising scanning the plurality of data blocks in the data store in which each of the hash values are computed and compared with a primary index associated with the data store to identify the corrupted data block in the data store.

20. The one or more computer-readable storage media of claim 16 wherein the duplicate data block includes an uncorrupted version of the corrupted data block.

* * * * *